Nov. 22, 1932.    L. VON REICHE ET AL    1,888,943
PROCEEDING AND ARRANGEMENT FOR MAKING OF FOAMY DRY DROSS
Filed June 29, 1929
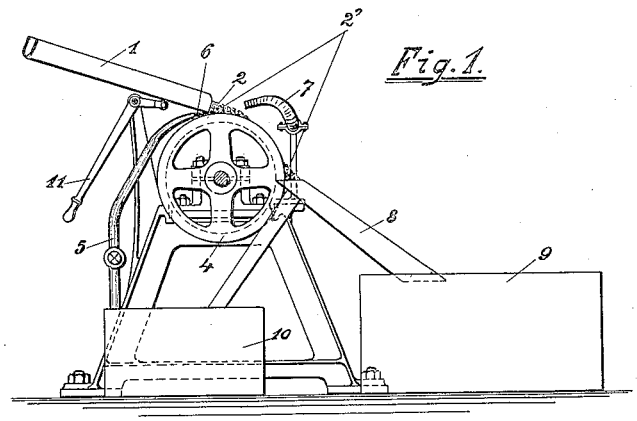
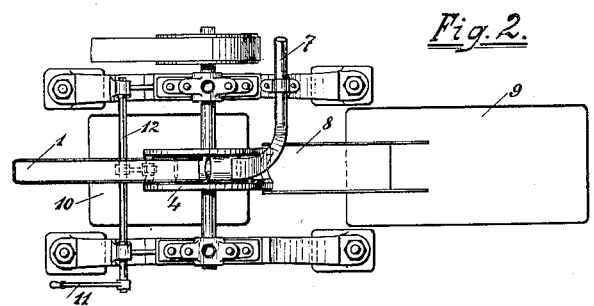
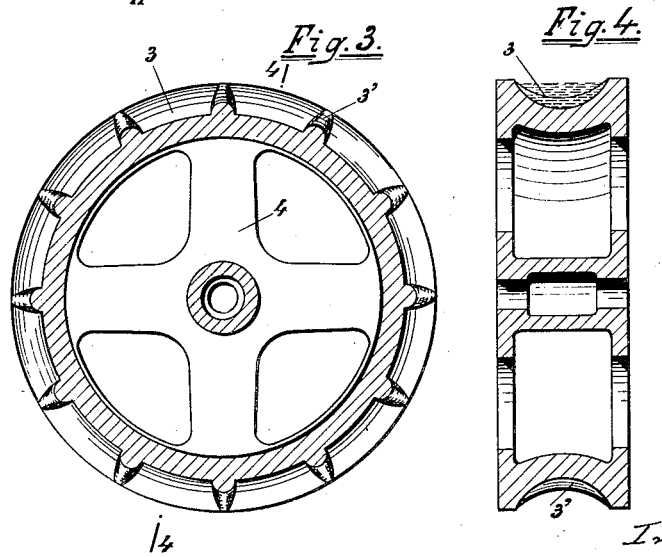
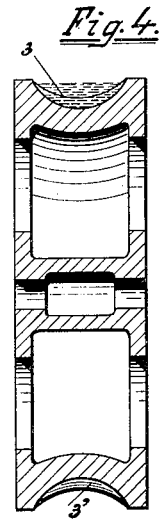
Inventors:
Ludwig von Reiche
and Julius Giersbach
Attorney.

Patented Nov. 22, 1932

1,888,943

UNITED STATES PATENT OFFICE

LUDWIG VON REICHE AND JULIUS GIERSBACH, OF OBERSCHELD (DILLKREIS), GERMANY

PROCEEDING AND ARRANGEMENT FOR MAKING OF FOAMY DRY DROSS

Application filed June 29, 1929, Serial No. 374,922, and in Germany July 4, 1928.

This invention relates to a machine for making a porous, foamy and dry dross out of high furnace-dross fluid by cooling with water. The current of the fluid dross will be charged or conducted in a movable tray, for instance in a turning wheel with a crown or rim cavated in such manner that the bottom of the tray is previously covered by a current of water by which the fluid dross is swelled under formation of numerous cavities and congealed. At the same time the surface of the current of dross is chilled by squirting up cooling means such as water, air or steam. By regulating the velocity of movement or of the effectual length of the tray the proceeding can be adapted to the actual condition of the dross. On principle one should only add as much water as is needed for swelling the dross or the surplus of water must be separated from the formed foamy dross at once after the swelling. The high degree of warmth remaining in the dross is sufficient for evaporation of the small parts of the water taken up by the foamy dross and for drying the same wholly.

In the accompanying drawing is exemplified and illustrated an arrangement for carrying out the process.

Fig. 1 is a side view of the machine.

Fig. 2 is a plan view thereof.

Fig. 3 is a sectional view of the wheel taken on line 3—3 of Fig. 4, and

Fig. 4 is a sectional view of the wheel taken on line 4—4 of Fig. 3.

The fire fluid dross flows in the channel member (1) as current (2) on to the tray (3) of a turning wheel (4), to which is conducted from the conduit (5) a current of water (6) for filling up the bottom of the tray. The dross and water are conducted on the tray and have no proper motion in themselves. For this purpose cross ribs 3' can be provided on the wheel on the bottom of the tray whereby it is divided into single boxes or sections. Through the conduit (7) a means of cooling for instance water, compressed air or steam of high pressure is blown on the surface of the dross current (2). The foam-dross arising from the tray is thrown off from the turning wheel or falls off by itself when the horizontal middle line of the wheel is passed over, and slides on the slide or the channel (8) to the collecting receptacle (9). The eventual surplus of water arising during the operation through the change of quantities of the dross, which has remained on the tray of the wheel drops off down after exceeding the horizontal middle line of the wheel and is collected in the reservoir 10. The velocity of the wheel can be regulated and is adjusted so that the dross remains in the tray just so long to allow it to be congealed to foam-dross. By lifting and lowering the inlet channel (1) by means of the lever 11 and the supporting shaft 12 fixed thereto, the bow or curve 2^ of the falling in current of dross can be shortened or lengthened and thus can lengthen or shorten the time of the influence of the water (6) on the bottom of the tray to the dross. By arranging and respectively using several systems situated one beside another of wheels (4), conveying channels (1), conduits of water (5) and conduits of cooling means 7 there can be corresponded in wide limits, to the changeable quantities of the fluid dross conducted.

We claim:

1. A process for making a foamy dry dross from fluid dross which comprises conveying the dross on to a current of water of an amount sufficient to swell the dross, and simultaneously blowing a cooling means on the surface of the current of the dross whereby the foamy dross is formed and the surplus of water removed therefrom.

2. A process for making a foamy dry dross from fluid dross which comprises conducting a fluid dross current through an adjustable height on to a current of water of an amount sufficient to swell the dross and simultaneously blowing a cooling means on the surface of the dross current whereby the surplus of water is separated from the foamy dross.

3. A machine for making a foamy dry dross from fluid dross, comprising a wheel adapted to rotate and having a plurality of trays on the peripheral face thereof formed by spaced cross ribs, said trays being adapted to receive water; means for conducting a current of water into the trays; a channel member arranged above the wheel and adapted to convey the fluid dross to the trays on to the water contained therein; means for directing a cooling medium on the water and dross in the trays; and a collecting receptacle for the foam dross.

4. A machine for making a foamy dry dross from fluid dross comprising a wheel adapted to rotate and having a plurality of trays on the peripheral face thereof formed by spaced cross ribs said trays being adapted to receive water; means for conducting a current of water into the trays; a channel member arranged above the wheel and adapted to convey the fluid dross to the trays on to the water contained therein; means for directing a cooling medium on the water and dross in the trays; a reservoir under the wheel for collecting the water dropping from the trays; and a collecting receptacle for the foam dross.

5. A machine for making a foamy dry dross from fluid dross comprising a wheel adapted to rotate and having a plurality of trays on the peripheral face thereof formed by spaced cross ribs, said trays being adapted to receive water; means for conducting a current of water into the trays; a channel member arranged above the wheel and adapted to convey the fluid dross to the trays on to the water contained therein; means for directing a cooling medium on the water and dross in the trays; a reservoir under the wheel for collecting the water dropping from the trays; a collecting receptacle for the foam dross; and a slide from the wheel into the receptacle for the dross.

6. A machine for making a foamy dry dross from fluid dross comprising a wheel adapted to rotate and having a plurality of trays on the peripheral face thereof formed by spaced cross ribs, said trays being adapted to receive water; means for conducting a current of water into the trays; a channel member arranged above the wheel and adapted to convey the fluid dross to the trays, on to the water contained therein; a collecting receptacle for the foam dross; and means for lifting and lowering said channel member to control the time of influence of the water on the dross.

7. A machine for making a foamy dry dross from fluid dross comprising a wheel adapted to rotate and having a plurality of trays on the peripheral face thereof formed by spaced cross ribs, said trays being adapted to receive water; means for conducting a current of water into the trays; a channel member arranged above the wheel and adapted to convey the fluid dross to the trays on to the water contained therein; means for directing a cooling medium on the water and dross in the trays; a collecting receptacle for the foam dross; and means for lifting and lowering said channel member to control the time of influence of the water on the dross.

8. A machine for making a foamy dry dross from fluid dross comprising a wheel adapted to rotate and having a plurality of trays on the peripheral face thereof formed by spaced cross ribs, said trays being adapted to receive water; means for conducting a current of water into the trays; a channel member arranged above the wheel and adapted to convey the fluid dross to the trays on to the water contained therein; means for directing a cooling medium on the water and dross in the trays; a reservoir under the wheel for collecting the water dropping from the trays; a collecting receptacle for the foam dross; a slide from the wheel into the receptacle for the dross; and means for lifting and lowering said channel member to control the time of influence of the water on the dross.

In testimony whereof we affix our signatures.

LUDWIG von REICHE.
JULIUS GIERSBACH.